United States Patent
Umeyama et al.

(10) Patent No.: US 9,515,313 B2
(45) Date of Patent: Dec. 6, 2016

(54) NONAQUEOUS ELECTROLYTE SECONDARY BATTERY AND METHOD OF PRODUCING SAME

(71) Applicant: TOYOTA JIDOSHA KABUSHIKI KAISHA, Toyota-shi, Aichi-ken (JP)

(72) Inventors: Hiroya Umeyama, Okazaki (JP); Tatsuya Hashimoto, Osaka (JP); Yusuke Fukumoto, Toyonaka (JP); Yuji Yokoyama, Moriguchi (JP); Koichi Toriyama, Osaka (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/697,165

(22) Filed: Apr. 27, 2015

(65) Prior Publication Data
US 2015/0333324 A1 Nov. 19, 2015

(30) Foreign Application Priority Data
May 19, 2014 (JP) ................. 2014-103341

(51) Int. Cl.
| H01M 4/00 | (2006.01) |
| H01M 4/131 | (2010.01) |
| H01M 4/36 | (2006.01) |
| H01M 4/136 | (2010.01) |
| H01M 4/62 | (2006.01) |
| H01M 4/1397 | (2010.01) |
| H01M 4/04 | (2006.01) |

(Continued)

(52) U.S. Cl.
CPC .......... H01M 4/131 (2013.01); H01M 4/0404 (2013.01); H01M 4/0433 (2013.01); H01M 4/136 (2013.01); H01M 4/1391 (2013.01); H01M 4/1397 (2013.01); H01M 4/364 (2013.01); H01M 4/625 (2013.01); H01M 10/052 (2013.01); *H01M 2004/021* (2013.01); *H01M 2004/028* (2013.01); *Y02E 60/122* (2013.01)

(58) Field of Classification Search
CPC .... H01M 4/131; H01M 4/136; H01M 4/361; H01M 4/625; H01M 4/1397; H01M 4/0433; H01M 4/0404; H01M 4/1391; H01M 10/052; H01M 2004/028; H01M 2004/021
See application file for complete search history.

(56) References Cited

U.S. PATENT DOCUMENTS

| 6,475,672 B1 * | 11/2002 | Iwata ................ C01G 45/02 423/599 |
| 2005/0132562 A1 * | 6/2005 | Saito ................ H01M 4/0404 29/623.5 |

(Continued)

FOREIGN PATENT DOCUMENTS

| JP | 9-180709 A | 7/1997 |
| JP | 2869156 B2 | 3/1999 |

(Continued)

*Primary Examiner* — Jane Rhee
(74) *Attorney, Agent, or Firm* — Sughrue Mion, PLLC

(57) ABSTRACT

A nonaqueous electrolyte secondary battery includes: a positive electrode collector core material; and a sheet body including a plurality of granulation bodies. The sheet body is disposed on the positive electrode collector core material. The granulation bodies each contain a first positive electrode active material particle, a second positive electrode active material particle, and expanded graphite, the first positive electrode active material particle including lithium-nickel composite oxide, the second positive electrode active material particle including lithium iron phosphate.

11 Claims, 10 Drawing Sheets

(51) Int. Cl.
*H01M 4/1391* (2010.01)
*H01M 10/052* (2010.01)
*H01M 4/02* (2006.01)

(56) References Cited

U.S. PATENT DOCUMENTS

| | | | |
|---|---|---|---|
| 2010/0021819 A1* | 1/2010 | Zhamu | H01G 9/058 429/231.8 |
| 2011/0274973 A1 | 11/2011 | Sheem et al. | |
| 2011/0311872 A1 | 12/2011 | Oh et al. | |
| 2012/0132849 A1 | 5/2012 | Fan | |
| 2012/0231341 A1 | 9/2012 | Kim et al. | |
| 2013/0059199 A1 | 3/2013 | Hara et al. | |
| 2014/0010752 A1* | 1/2014 | Kagei | C01D 15/02 423/594.15 |

FOREIGN PATENT DOCUMENTS

| | | |
|---|---|---|
| JP | 2003-203636 A | 7/2003 |
| JP | 2006-303395 A | 11/2006 |
| JP | 2011-086405 A | 4/2011 |
| JP | 2011-228293 A | 11/2011 |
| JP | 2011-238586 A | 11/2011 |
| JP | 2012-190786 A | 10/2012 |
| JP | 2013-520783 A | 6/2013 |

* cited by examiner

NONAQUEOUS ELECTROLYTE SECONDARY BATTERY AND METHOD OF PRODUCING SAME

This nonprovisional application is based on Japanese Patent Application No. 2014-103341 filed on May 19, 2014, with the Japan Patent Office, the entire contents of which are hereby incorporated by reference.

BACKGROUND OF THE INVENTION

1. Field of the Invention

The present invention relates to a nonaqueous electrolyte secondary battery and a method of producing the nonaqueous electrolyte secondary battery.

2. Description of the Background Art

Japanese Patent Laying-Open No. 2011-228293 discloses a nonaqueous electrolyte secondary battery including a positive electrode containing a first active material and a second active material, the first active material including lithium transition metal composite oxide expressed by a general formula $LiNi_xMn_yCo_zO_2$ ($x+y+z=1$, $x>0$, $y>0$, $z>0$), the second active material including $LiFePO_4$.

SUMMARY OF THE INVENTION

A nonaqueous electrolyte secondary battery employing a lithium-nickel composite oxide solely as a positive electrode active material has a limit in output characteristic at a low state of charge, i.e., low SOC. This is due to the following reason: in lithium-nickel composite oxide, insertion reaction of lithium ions ($Li^+$) proceeds mainly at a high to intermediate SOC (about 3.8 to 3.5 V) and vacancy is accordingly decreased in $Li^+$ insertion sites in the crystal at a low SOC (about 3.0 to 3.4 V), which leads to increased reaction resistance.

In Japanese Patent Laying-Open No. 2011-228293, improvement in output at a low SOC is attempted by way of a mixed positive electrode employing both lithium-nickel composite oxide and lithium iron phosphate. In the lithium iron phosphate, insertion reaction of $Li^+$ mainly proceeds at about 3.0 to 3.4 V. Therefore, this mixed positive electrode can receive $Li^+$ even at a low SOC, whereby improvement of output at a low SOC is expected.

However, regarding such a nonaqueous electrolyte secondary battery including the mixed positive electrode, there is room for improvement in durability. Specifically, a high output characteristic can be exhibited at an initial stage, but deterioration in capacity after cycles or high-temperature storage is noticeable, with the result that a sufficient output characteristic cannot be exhibited after endurance. In view of this, as a result of the present inventors fully analyzing a cause of decrease in output after endurance, the following knowledge has been obtained.

First, if the upper limit voltage of the battery is set at about 4.0 V to 4.1 V, lithium iron phosphate is exposed to voltage higher than its operating voltage (about 3.0 V to 3.4 V) whenever charging/discharge is performed, which result in excessive expansion/contraction of lithium iron phosphate. Accordingly, a conductive material such as carbon black cannot follow such expansion/contraction, thereby disconnecting an electric conduction path in the electrode to result in increased electric resistance.

Second, because a lithium iron phosphate particle normally has a particle size smaller than that of a lithium nickel composite oxide particle, it is difficult to mix both of them uniformly, with the result that the electric conduction path in the electrode readily becomes discontinuous. Therefore, in such a mixed positive electrode, the electric conduction network is vulnerable by nature, and the electric conduction network is readily disconnected when the expansion/contraction of lithium iron phosphate is repeated during endurance.

Third, a conventional mainstream method of fabricating a positive electrode plate is such that a coating material (also referred to as "slurry" or "paste") including positive electrode active material particles, a conductive material, and the like is prepared and is then applied onto a collector core material to form a positive electrode composite material layer, and has a cause of decrease in output because it is impossible to appropriately control dispersion states of the positive electrode active material particles and the conductive material, i.e., an arrangement relation between the positive electrode active material particles and the conductive material in the positive electrode composite material layer.

In view of the problem described above, the present invention has an object to provide a nonaqueous electrolyte secondary battery excellent in an output characteristic at a low SOC and also excellent in durability.

[1] A nonaqueous electrolyte secondary battery includes: a positive electrode collector core material; and a sheet body including a plurality of granulation bodies, the sheet body being disposed on the positive electrode collector core material, the granulation bodies each containing a first positive electrode active material particle, a second positive electrode active material particle, and expanded graphite, the first positive electrode active material particle including lithium-nickel composite oxide, the second positive electrode active material particle including lithium iron phosphate.

The sheet body corresponds to a positive electrode composite material layer. This sheet body includes the plurality of granulation bodies, each of which contains the first positive electrode active material particle, the second positive electrode active material particle, and the expanded graphite (conductive material). Therefore, it is possible to control arrangement of the positive electrode active material particle and the conductive material in each granulation body.

Here, the "expanded graphite" is graphite in which an interlayer spacing is expanded in the crystalline structure of graphite, serves as a conductive material, and is excellent in elasticity and is therefore capable of following expansion/contraction of the second positive electrode active material particle (lithium iron phosphate). Accordingly, a secure electric conduction path is formed which is capable of withstanding excessive expansion/contraction of the second positive electrode active material particle in the granulation body.

As described above, the nonaqueous electrolyte secondary battery exhibits excellent durability even though the nonaqueous electrolyte secondary battery includes the mixed positive electrode including lithium-nickel composite oxide and lithium iron phosphate.

[2] The granulation body is preferably a pillar-like body.

Such a granulation body can be fabricated by extrusion granulation described below, for example. On this occasion, the expanded graphite in the granulation body is oriented in the extrusion direction. Because the expanded graphite (conductive material) has orientation, an electric conduction path is likely to be continuous in the granulation body, thereby reducing electric resistance and improving an output characteristic.

[3] The plurality of granulation bodies are preferably oriented in one direction in a plane direction of the sheet body.

Because each of the granulation bodies of the sheet body has uniform orientation, an electric conduction path is likely to be continuous also between the granulation bodies adjacent to each other, thereby constructing an electric conduction network stable in the plane direction of the sheet body.

[4] The positive electrode collector core material is preferably an elongated strip-like body, and the plurality of granulation bodies are preferably oriented in a short direction of the positive electrode collector core material in the plane direction of the sheet body.

With such a configuration, the orientation direction of the granulation bodies and the direction in which electrons flow coincide with each other in the sheet body when a collector unit is provided at an end portion in the short direction (width direction) of the positive electrode collector core material, thereby reducing electric resistance and further improving an output characteristic.

[5] The granulation body preferably has a diameter of not less than 0.5 mm and not more than 2.0 mm.

With the extrusion granulation, the shape of the granulation body can be controlled by the shape of a die hole (extrusion hole), and the outer shape of the granulation body can be in the form of a pillar-like body, for example. Since the pillar-like bodies can be readily oriented in the axial direction, the orientation of the granulation bodies in the sheet body can be improved further.

Of pillar-like bodies, a cylindrical body is of a shape with which it is particularly likely to be oriented. Moreover, the cylindrical body is also good in packing property. Further, when the diameter is not less than 0.5 mm and not more than 2.0 mm, the orientation is likely to be maintained even after being formed into the sheet body.

[6] The expanded graphite is preferably exposed at a surface of the granulation body.

Accordingly, electrons are likely to be propagated through the expanded graphite at a contact point between the granulation bodies. In other words, electric resistance can be further reduced.

[7] The second positive electrode active material particle preferably has a surface provided with a conductive layer including carbon.

Accordingly, the second positive electrode active material particle is provided with high conductivity, thereby improving an output characteristic. Furthermore, the conductive layer includes carbon to increase affinity between the second positive electrode active material particle and the expanded graphite, whereby the second positive electrode active material particle and the expanded graphite are close to each other in the granulation body. Accordingly, the excessive expansion/contraction of the second positive electrode active material particle can be eased efficiently by the expanded graphite disposed around the second positive electrode active material particle.

In addition, excellence in lubricity of the expanded graphite and the affinity between the second positive electrode active material particle and the expanded graphite provide increased dispersibility of the second positive electrode active material particle during granulation. Accordingly, the first positive electrode active material particle and the second positive electrode active material particle, which are different from each other in particle size, can be uniformly mixed. Therefore, even when a little amount of the expanded graphite is used, a sufficient electric conduction network can be formed. In other words, this can contribute to reduction of the amount of the conductive material used and increase in energy density. Moreover, this also provides reduction of side reaction (such as generation of gas or the like) caused by the conductive material.

The present invention also provides a method of producing a nonaqueous electrolyte secondary battery as follows.

[8] A method of producing a nonaqueous electrolyte secondary battery includes: a first step of obtaining a mixture by mixing a first positive electrode active material particle, a second positive electrode active material particle, and expanded graphite with one another, the first positive electrode active material particle including lithium-nickel composite oxide, the second positive electrode active material particle including lithium iron phosphate; a second step of obtaining a plurality of granulation bodies by granulating the mixture; and a third step of obtaining a sheet body from the plurality of granulation bodies by pressure molding; and a fourth step of disposing the sheet body on a positive electrode collector core material.

According to the method of fabricating the positive electrode plate from the granulation bodies without using a coating material as in the first step to the fourth step, it is possible to appropriately control arrangement of the first positive electrode active material particle, the second positive electrode active material particle, and the expanded graphite.

Because the expanded graphite is excellent in lubricity as described above, the expanded graphite is likely to be exposed at the surface of the granulation body in the granulation process (first and second steps). In the third step, the plurality of granulation bodies are compressed and drawn into a form of sheet. On this occasion, the granulation bodies receive compressive force, so that the expanded graphite in each of the granulation bodies is pushed to the surface of the granulation body. In other words, at a stage after the third step, the expanded graphite is more exposed at the surface of the granulation body. Therefore, in the sheet body, an electric conduction path is formed between the granulation bodies adjacent to each other by the expanded graphite exposed at the surface, thereby constructing a stable electric conduction network across the entire sheet body.

[9] The second step is preferably a step of obtaining the plurality of granulation bodies by extrusion granulation. With the extrusion granulation, in the granulation body, the expanded graphite can be readily oriented.

[10] The third step preferably includes a step of obtaining the sheet body from the plurality of granulation bodies such that the plurality of granulation bodies are oriented in one direction in a plane direction.

Examples of such a step include a step of obtaining the sheet body by, for example, a roll drawing method. Specifically, according to the roll drawing method, when each of the granulation bodies is a pillar-like body, the granulation bodies are spontaneously oriented and aligned in a direction along the rotation axis of each roll during conveyance on the rolls. Accordingly, a positive electrode plate having a secure electric conduction network can be produced.

[11] The positive electrode collector core material is preferably an elongated strip-like body, and the fourth step preferably includes a step of disposing the sheet body on the positive electrode collector core material such that the one direction in [10] above is along a short direction of the positive electrode collector core material.

In this manner, the orientation direction of the granulation bodies and the direction in which electrons flow coincide with each other in the sheet body when the collector unit is provided at the end portion in the short direction of the positive electrode collector core material, thereby further reducing electric resistance.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

The following describes one embodiment of the present invention (hereinafter, also referred to as "the present embodiment") in detail, but the present embodiment is not limited to this. It should be noted that unless otherwise particularly noted in the description below, the term "average particle size" is intended to indicate a median size (d50) measured by a laser diffraction/scattering method.

[Nonaqueous Electrolyte Secondary Battery]

Figure 10:
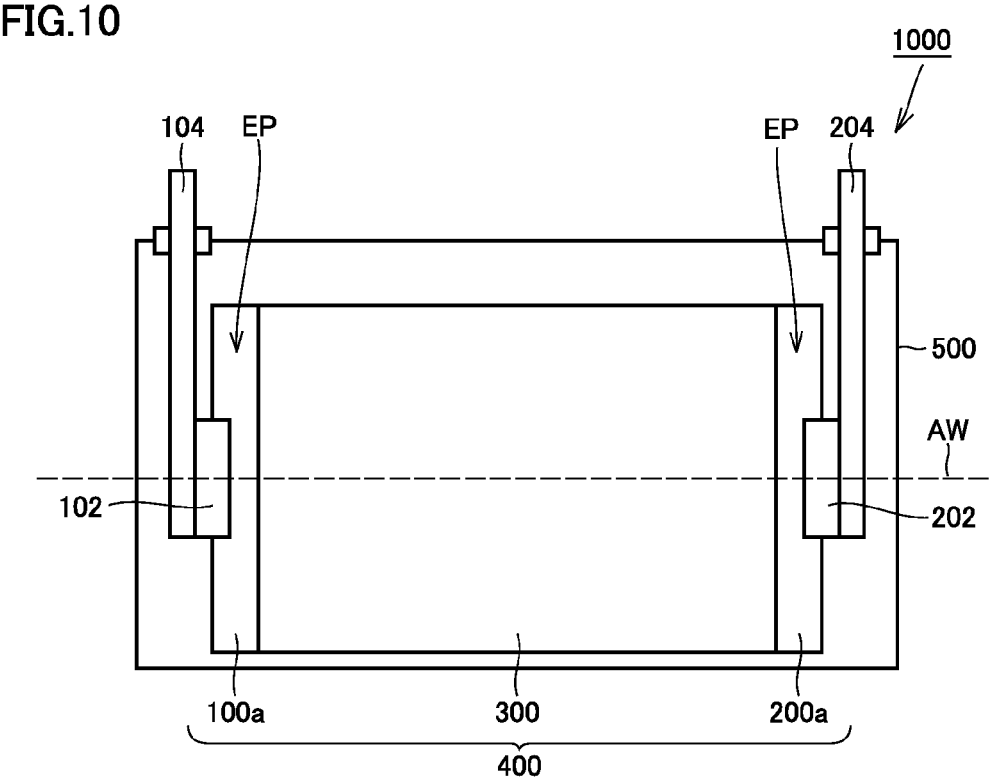
FIG. 10 is a schematic cross sectional view showing one example of a configuration of a nonaqueous electrolyte secondary battery according to the embodiment of the present invention.

FIG. 10 is a schematic cross sectional view showing one example of a configuration of a nonaqueous electrolyte secondary battery of the present embodiment. With reference to FIG. 10, battery 1000 includes an electrode assembly 400 and a nonaqueous electrolyte (not shown) inside a prismatic package 500. Package 500 is made of a material such as an Al alloy.

Figure 7:
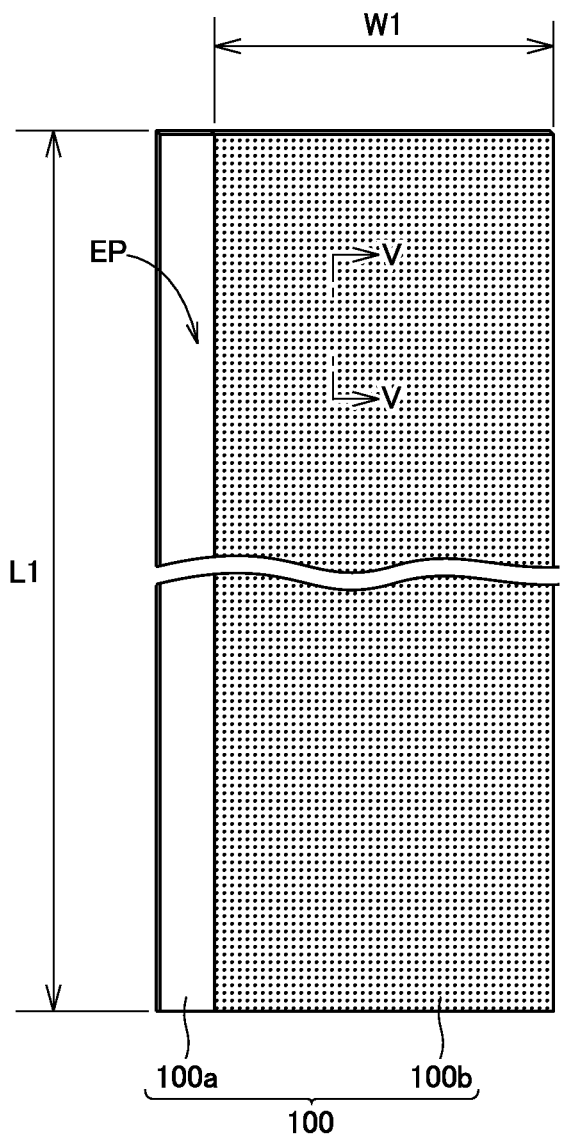
FIG. 7 is a schematic plan view showing one example of the configuration of the positive electrode plate according to the embodiment of the present invention.
Figure 8:
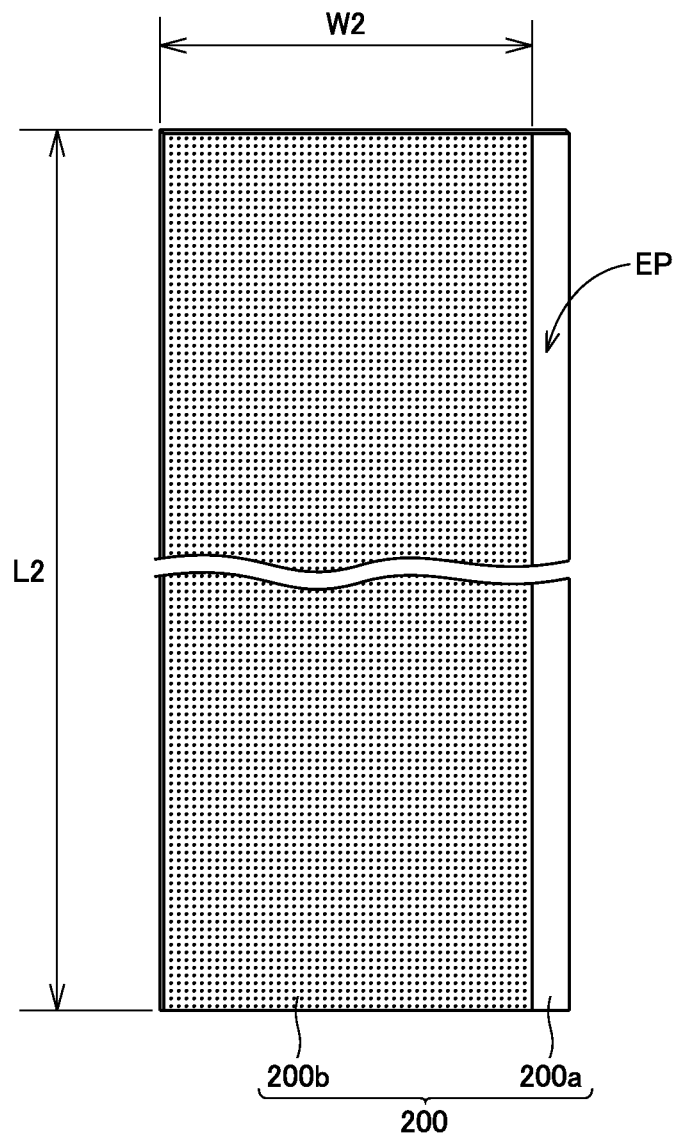
FIG. 8 is a schematic plan view showing one example of a configuration of a negative electrode plate according to the embodiment of the present invention.

Electrode assembly 400 has a positive electrode plate 100, a negative electrode plate 200, and a separator 300. With reference to FIG. 7 and FIG. 8, each of positive electrode plate 100 and negative electrode plate 200 is an elongated strip-like body, and has a portion (core-material exposed portion EP) in which a collector core material is exposed continuously at an end portion thereof in the short direction.

Figure 9:
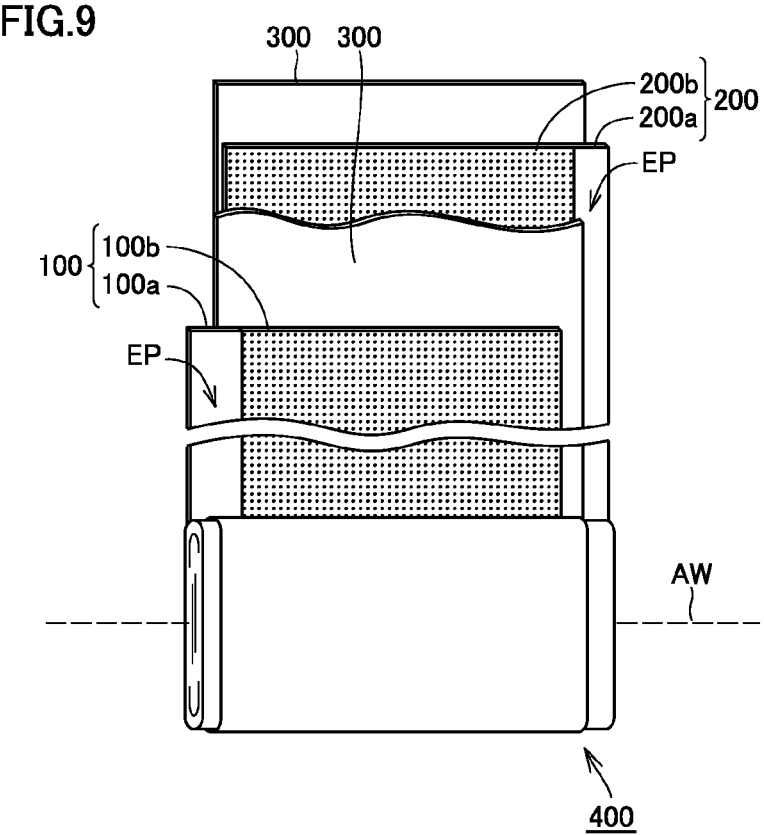
FIG. 9 is a schematic view showing one example of a configuration of an electrode assembly according to the embodiment of the present invention.

With reference to FIG. 9, electrode assembly 400 is configured such that positive electrode plate 100 and negative electrode plate 200 are wound to face each other with separator 300 interposed therebetween. As shown in FIG. 9, positive electrode plate 100 and negative electrode plate 200 are disposed to face each other such that respective core-material exposed portions EP of positive electrode plate 100 and negative electrode plate 200 are exposed in different directions on a winding axis AW.

With reference to FIG. 10 again, a positive electrode collector plate 102 and a negative electrode collector plate 202 are welded respectively to core-material exposed portions EP of electrode assembly 400. Positive electrode collector plate 102 is connected to a positive electrode terminal 104, and negative electrode collector plate 202 is connected to a negative electrode terminal 204. In this way, a current path from each of the electrode plates to each of the terminals is formed.

The following describes each of members of battery 1000.

<Positive Electrode Plate>

Figure 5:
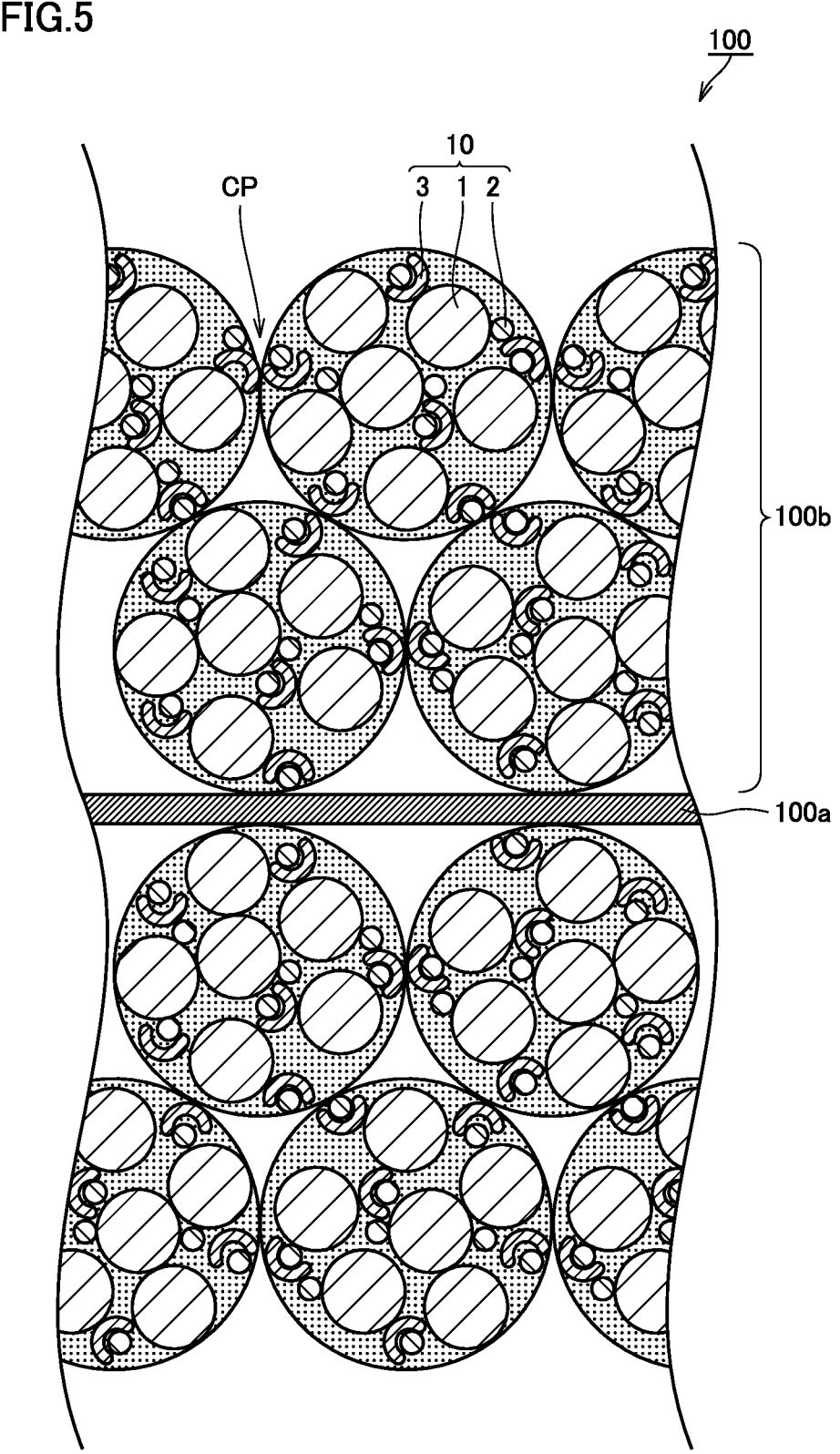
FIG. 5 is a schematic partial cross sectional view showing one example of a configuration of the positive electrode plate according to the embodiment of the present invention, and is a schematic cross sectional view along a V-V line of FIG. 7.

FIG. 5 is a schematic partial cross sectional view of positive electrode plate 100 along a V-V line of FIG. 7. With reference to FIG. 5, positive electrode plate 100 includes a positive electrode collector core material 100a, and a sheet body 100b including a plurality of granulation bodies 10. Positive electrode collector core material 100a is an Al foil or the like, for example. Sheet body 100b is formed on each of the main surfaces of positive electrode collector core material 100a.

(Sheet Body)

In the present embodiment, sheet body 100b constitutes a so-called positive electrode composite material layer, and includes the plurality of granulation bodies 10. Sheet body 100b has a thickness of, for example, about 10 to 200 μm, preferably about 30 to 150 μm, and more preferably about 40 to 100 μm. Sheet body 100b has a density of about 2.5 to 4.5 g/cm$^3$, for example.

(Granulation Body)

Figure 1:
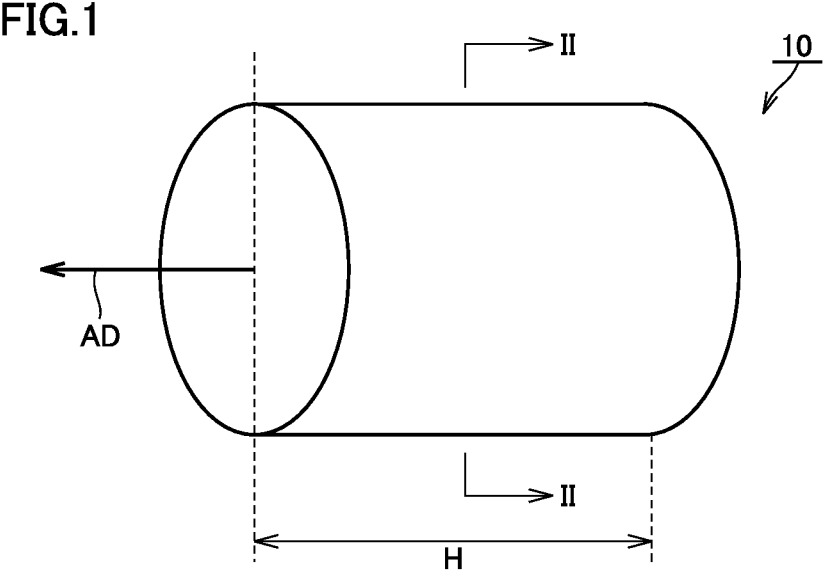
FIG. 1 is a schematic perspective view showing one example of a granulation body according to one embodiment of the present invention.

FIG. 1 is a schematic perspective view showing one example of granulation body 10. As shown in FIG. 1, granulation body 10 is preferably a pillar-like body having an axial direction AD (height direction). This is because such a pillar-like body can be readily produced by extrusion granulation described later and orientation in sheet body 100b can be readily controlled. In a plane direction of sheet body 100b, granulation bodies 10 are oriented in a certain direction, thereby forming a stable electric conduction network in which an electric conduction path is likely to be continuous.

Figure 4:
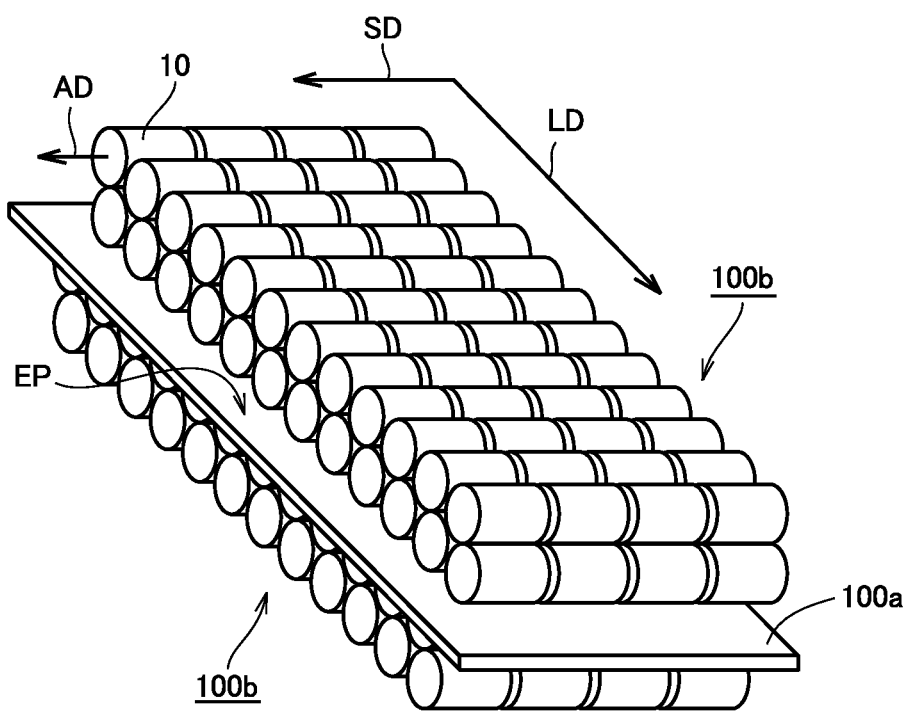
FIG. 4 is a schematic perspective view showing one example of a configuration of a positive electrode plate according to the embodiment of the present invention.

FIG. 4 is a schematic perspective view showing one example of an orientation state of granulation bodies 10. As shown in FIG. 4, each of positive electrode collector core material 100a and sheet body 100b is an elongated strip-like body. Granulation bodies 10, each of which is a pillar-like body, are oriented with their axial directions AD being along short direction SD of positive electrode collector core material 100a. The plurality of granulation bodies 10 have the same orientation and are aligned in a longitudinal direction LD. As described above, core-material exposed portion EP provided at the end portion in short direction SD is welded to positive electrode collector plate 102, thereby providing a collector portion. Hence, in this sheet body 100b, granulation bodies 10 are oriented in the direction in which electrons flow, whereby electrons can be moved efficiently.

Figure 3:
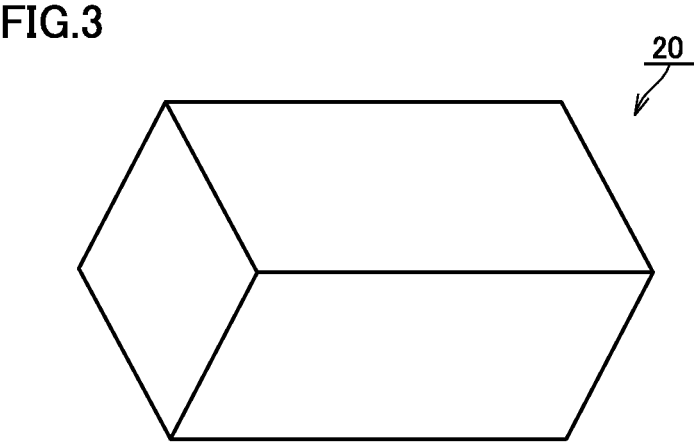
FIG. 3 is a schematic perspective view showing a modification of the granulation body according to the embodiment of the present invention.

It should be noted that granulation body 10 shown in FIG. 1 or the like has a cylindrical shape, but the shape of granulation body 10 is not limited to this and may be prismatic such as a granulation body 20 shown in FIG. 3, for example. Moreover, sheet body 100b (i.e., the plurality of granulation bodies 10) is usually compressed during its production process. Therefore, granulation bodies 10 included in sheet body 100b are not of a strictly cylindrical or prismatic shape, and are of a pillar-like shape originating therefrom.

Figure 2:
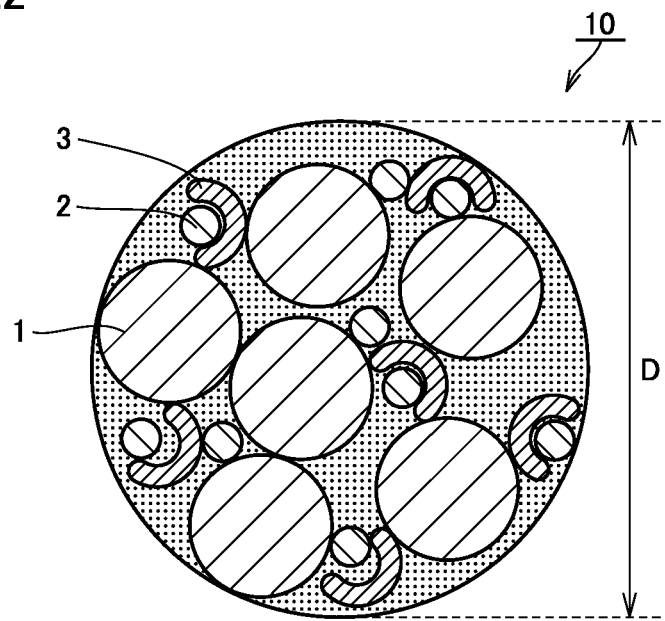
FIG. 2 is a schematic view showing one example of a configuration of the granulation body according to the embodiment of the present invention, and is a schematic cross sectional view along a line II-II of FIG. 1.

FIG. 2 is a schematic cross sectional view of granulation body 10 along a II-II line of FIG. 1. With reference to FIG. 2, granulation body 10 contains: a first positive electrode active material particle 1 including lithium-nickel composite oxide; a second positive electrode active material particle 2 including lithium iron phosphate; and expanded graphite 3. Thus, the dispersion states of the lithium-nickel composite oxide, the lithium iron phosphate, and the conductive material are controlled in each granulation body, whereby uneven distribution of the materials can be suppressed as compared with that in the conventional application method. That is, each of the materials can be dispersed more uniformly.

(Expanded Graphite)

Expanded graphite 3 is graphite in which an interlayer spacing is expanded in the crystalline structure of graphite, and serves as a conductive material. Expanded graphite 3 is excellent in elasticity, and therefore can follow expansion/contraction of second positive electrode active material particle 2. Therefore, the electric conduction path can be suppressed from being broken during cycle endurance.

Expanded graphite 3 is also excellent in lubricity. Therefore, during granulation, expanded graphite 3 is likely to be exposed at the surface of granulation body 10. Moreover, when granulation body 10 is compressed during the sheet formation, expanded graphite 3 can be further pushed to the surface of granulation body 10, whereby granulation body 10 is covered with expanded graphite 3 depending on conditions. Because expanded graphite 3 is thus exposed at the surface of granulation body 10, a contact point CP between granulation bodies 10 is formed by highly conductive expanded graphite 3 as shown in FIG. 5, for example. Such contact points CP are formed between granulation bodies 10 vertically and horizontally adjacent to each other, thereby constructing a good electric conduction network.

A ratio of expanded graphite 3 in granulation body 10 is preferably not less than 0.44 mass % and not more than 5.83 mass %, and is more preferably not less than 0.88 mass % and not more than 3.42 mass %. This is because when the ratio is in such a range, the function as a conductive material can be secured while suppressing side reaction during high-temperature storage.

Moreover, expanded graphite 3 has a characteristic such that it is likely to be oriented. For example, when granulation body 10 is produced by extrusion granulation, expanded graphite 3 can be oriented in the extrusion direction (i.e., axial direction AD of granulation body 10). In this way, disconnection in the electric conduction path in granulation body 10 is decreased, thereby reducing electric resistance.

(Evaluation of Orientation)

The orientation of each of expanded graphite 3 and granulation body 10 can be evaluated by an X-ray diffraction (XRD) method. Specifically, the orientation of each of expanded graphite 3 and granulation body 10 can be evaluated by performing X-ray diffraction in the surface of sheet body 100b using an X-ray diffractometer and analyzing an obtained X-ray diffraction pattern.

Figure 13:
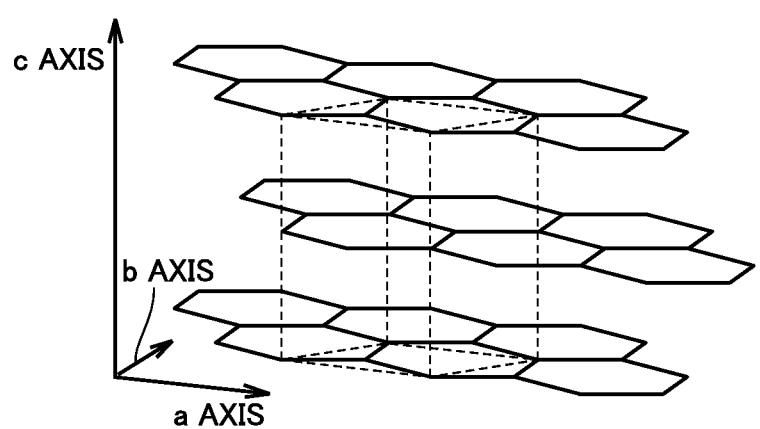
FIG. 13 is a schematic view showing a crystalline structure of graphite.

FIG. 13 is a schematic view showing a crystalline structure of graphite. With reference to FIG. 13, it is known that a graphite crystal has an interlayer direction (c-axis direction) and a plane direction (ab-axis direction) and that a (002) plane peak and a (004) plane peak result from the c-axis direction and a (110) plane peak results from the ab-axis direction in the X-ray diffraction pattern.

When granulation body 10 is obtained by extrusion granulation as described above, the orientation is attained such that the c-axis direction of expanded graphite 3 is along the extrusion direction in granulation body 10. Further, when granulation body 10 is a pillar-like body, each of granulation bodies 10 can be oriented in one direction in the plane direction of sheet body 100b. In other words, in the plane direction of sheet body 100b, the c-axis direction of expanded graphite 3 can be oriented in one direction.

According to the research of the present inventors, when expanded graphite 3 is oriented in one direction in the plane direction of sheet body 100b, the following feature appears in the X-ray diffraction pattern of sheet body 100b. That is, each of a intensity ratio $I_{(110)}/I_{(004)}$ between the (110) plane peak and the (004) plane peak and a intensity ratio $I_{(110)}/I_{(002)}$ between the (110) plane peak and the (002) plane peak becomes 0.030 or more. A larger value in each of intensity ratios $I_{(110)}/I_{(004)}$ and $I_{(110)}/I_{(002)}$ represents stronger orientation of expanded graphite 3, and a larger value thereof is more preferable. Hence, each of intensity ratios $I_{(110)}/I_{(004)}$ and $I_{(110)}/I_{(002)}$ is more preferably 0.040 or more, and is particularly preferably 0.050 or more. On the other hand, when the orientation is not sufficient, at least one of intensity ratios $I_{(110)}/I_{(004)}$ and $I_{(110)}/I_{(002)}$ becomes less than 0.030.

(First Positive Electrode Active Material Particle)

First positive electrode active material particle 1 includes lithium-nickel composite oxide. The lithium-nickel composite oxide is a composite oxide including Li and Ni as essential composition elements, and represents a compound expressed by a general formula $LiNi_{1-x}M_xO_2$ (where M represents one or more elements selected from Co, Mn and Al and x satisfies $0 \leq x<1$).

Specific examples of such a compound include $LiNiO_2$, $LiNi_{0.8}Co_{0.2}O_2$, $LiNi_{0.8}Co_{0.15}Al_{0.05}O_2$, $LiNi_{0.5}Mn_{0.5}O_2$, $LiNi_{1/3}Mn_{1/3}Co_{1/3}O_2$, and the like. The lithium-nickel composite oxide is excellent in energy density at a high to intermediate SOC. Of these, a compound expressed by a general formula $LiNi_aCo_bMn_cO_2$ (where $0<a<1$, $0<b<1$, $0<c<1$, and $a+b+c=1$), such as $LiNi_{1/3}Mn_{1/3}Co_{1/3}O_2$, is particularly suitable as first positive electrode active material particle 1 because it is excellent in balance between energy density and thermal stability.

Here, a, b, and c in the general formula $LiNi_aCo_bMn_cO_2$ more preferably satisfy $0.2<a<0.4$, $0.2<b<0.4$, and $0.2<c<0.4$, and further preferably satisfy $0.3<a<0.35$, $0.3<b<0.35$, and $0.3<c<0.35$. This is because when the composition ratio of Ni, Co, and Mn satisfies the relation described above, the balance between energy density and thermal stability is further improved.

The lithium-nickel composite oxide may be doped slightly with a different type of element. Examples of such a different type of element include Mg, Si, Ca, Ti, V, Cr, Zn, Ga, Zr, Nb, Mo, Sn, Hf, W, and the like.

In order to facilitate to realize a suitable dispersion state in granulation body 10, the average particle size of first positive electrode active material particles 1 is, for example, about 1 to 20 μm, preferably about 3 to 15 μm, and more preferably about 5 to 10 μm.

It should be noted that the term "positive electrode active material particle" in the present specification is intended to encompass: a primary particle made of a positive electrode active material; a secondary particle obtained by the primary particle being aggregated; and a composite particle obtained by forming a coating layer or the like on the surface of the secondary particle.

(Second Positive Electrode Active Material Particle)

Second positive electrode active material particle 2 includes lithium iron phosphate. The lithium iron phosphate is composite phosphate represented by a chemical formula $LiFePO_4$, and has an olivine type crystal structure. In the lithium iron phosphate of the present embodiment, part of Fe in the above-described chemical formula may be replaced with another element (for example, Co, Ni, Mn, and the like) as long as the output characteristic at a low SOC is not decreased too much. Further, the lithium iron phosphate may be slightly doped with the different type of element described above.

Second positive electrode active material particle 2 is desirably a composite particle having a surface provided with a conductive layer including carbon. This is because the conductivity of the lithium iron phosphate is accordingly supplemented and the output is improved. Moreover, affinity is increased between second positive electrode active material particle 2 and expanded graphite 3, and expanded graphite 3 is attracted to second positive electrode active material particle 2 during the granulation, thereby realizing a state in which they are close to each other. Accordingly, in granulation body 10, the expansion/contraction of second positive electrode active material particle 2 can be absorbed and eased efficiently by expanded graphite 3. Moreover, because expanded graphite 3 is excellent in lubricity, the dispersibility of second positive electrode active material particle 2 is improved due to expanded graphite 3 and second positive electrode active material particle 2 being close to each other during the granulation, thereby contributing to improvement in output at a low SOC.

As the conductive layer including carbon, a general carbon coating layer can be employed, for example. In that case, an amount of coating is not particularly limited, but a mass ratio between the base material (lithium iron phosphate particle) and the coating layer (carbon) is about 98:2 to 99:1, for example.

It should be noted that the conductive layer may be provided on at least a portion of the surface of second positive electrode active material particle 2, and may not necessarily cover the entire surface thereof uniformly. This is because the same function can be obtained as long as the conductive layer is provided at least on the portion thereof.

In order to facilitate to realize a suitable dispersion state in granulation body 10, the average particle size of second positive electrode active material particles 2 is, for example, about 1 to 6 μm, preferably about 1 to 5 μm, and more preferably about 2 to 4 μm.

For energy density of the battery, a ratio of the total mass of first positive electrode active material particles 1 and second positive electrode active material particles 2 in sheet body 100b is preferably not less than 90 mass % and not more than 99 mass %, more preferably not less than 92 mass % and not more than 98 mass %, and particularly preferably not less than 93 mass % and not more than 97 mass %.

Moreover, a ratio of second positive electrode active material particles 2 in the total mass of first positive electrode active material particles 1 and second positive electrode active material particles 2 is preferably not less than 5 mass % and not more than 20 mass %, more preferably not less than 5 mass % and not more than 15 mass %, and particularly preferably not less than 5 mass % and not more than 10 mass %. With such ranges, both the energy density and the output at a low SOC can be attained.

(Other Components)

As long as granulation body 10 contains first positive electrode active material particle 1, second positive electrode active material particle 2, and expanded graphite 3, granulation body 10 can contain any components in addition to these. Examples of such components include a binder, a conductive material other than the expanded graphite, and the like.

Granulation body 10 can contain a binder. Such a binder is not particularly limited, and a conventionally known material can be used. For example, polyvinylidene difluoride (PVdF), polytetrafluoroethylene (PTFE), or the like can be used. The ratio of the binder in granulation body 10 is, for example, about 0.5 to 5 mass %, preferably about 1 to 4 mass %, and more preferably about 1 to 2 mass %.

Granulation body 10 may contain a conductive material other than expanded graphite 3. Examples of such a conductive material includes acetylene black (AB), Ketchen Black®, vapor growth carbon fiber (VGCF), vein graphite, flake graphite, amorphus graphite, spheroidal graphite, and the like. The ratio of the conductive material other than expanded graphite 3 in granulation body 10 is preferably not less than 0.1 mass % and not more than 2 mass %, and more preferably not less than 0.1 mass % and not more than 1 mass %. Because expanded graphite 3 is used in the present embodiment, an amount of such a conductive material used can be reduced.

<Negative Electrode Plate>

With reference to FIG. 8, negative electrode plate 200 is an elongated strip-like body, and has a negative electrode collector core material 200a and a negative electrode composite material layer 200b formed on negative electrode collector core material 200a. Negative electrode collector core material 200a is a Cu foil or the like, for example. Moreover, the composite material density of negative electrode composite material layer 200b is about 0.5 to 2.5 g/cm$^3$, for example.

Negative electrode composite material layer 200b is configured such that a negative electrode composite material including the negative electrode active material and the binder is adhered onto negative electrode collector core material 200a. The negative electrode active material is not particularly limited, and may function as the negative electrode active material of the nonaqueous electrolyte secondary battery. For example, a carbon-based negative electrode active material such as graphite, an alloy-based negative electrode active material such as Si or Sn, and the like can be used. A ratio of the negative electrode active material in the negative electrode composite material is about 90 to 99 mass %, for example.

The binder is also not particularly limited, and examples thereof can include conventionally known materials such as carboxymethylcellulose (CMC), PTFE, and styrene-butadiene rubber (SBR). A ratio of the binder in the negative electrode composite material is about 1 to 10 mass %, for example.

<Separator>

Separator 300 permits passage of Li+, and prevents electrical contact between positive electrode plate 100 and negative electrode plate 200. In view of mechanical intensity and chemical stability, separator 300 is preferably a fine porous membrane made of a polyolefin-based material. For example, a fine porous membrane, such as polyethylene (PE) or polypropylene (PP), is suitable.

Moreover, separator 300 may be a laminate of a plurality of fine porous membranes, or may be provided with a heat-resistant layer including an inorganic filler (such as alumina particles, magnesia particles, or titania particles) on its surface. Separator 300 can have a thickness of about 5 to 40 μm, for example. The pore size and void content of separator 300 may be appropriately adjusted to attain a desired value of air permeability.

<Nonaqueous Electrolyte>

The nonaqueous electrolyte is a liquid electrolyte (nonaqueous electrolytic solution) obtained by dissolving a solute (Li salt) in an aprotic solvent. Examples of the aprotic solvent include: cyclic carbonates such as ethylene carbonate (EC), propylene carbonate (PC), butylene carbonate (BC), γ-butyrolactone (GBL) and vinylene carbonate (VC); and chain carbonates such as dimethyl carbonate (DMC), ethyl methyl carbonate (EMC) and diethyl carbonate (DEC). Two or more of these aprotic solvents are preferably used together in view of electric conductivity and electrochemical stability. Particularly, it is desirable to mix and use a cyclic carbonate and a chain carbonate, and in doing so, a volume ratio between the cyclic carbonate and the chain carbonate is preferably about 1:9 to 5:5. As a specific example, three carbonates, such as EC, DMC, and EMC, can be mixed and used, for example.

Examples of the solute (Li salt) include lithium hexafluorophosphate ($LiPF_6$), lithium tetrafluoroborate ($LiBF_4$), lithium perchlorate ($LiClO_4$), lithium hexafluoroarsenate ($LiAsF_6$), lithium bis(trifluoromethanesulfonyl)imide [Li$(CF_3SO_2)_2$N], lithium trifluoromethanesulfonate ($LiCF_3SO_3$), and the like. Moreover, two or more of these solutes may be used together. The concentration of the solute in the nonaqueous electrolyte is not particularly limited, but is preferably about 0.5 to 2.0 mol/L in view of discharging characteristic and storage characteristic.

Furthermore, the nonaqueous electrolyte may be provided with a substance, such as cyclohexylbenzene (CHB) or biphenyl (BP), which is intended to be decomposed under a predetermined voltage. Moreover, the nonaqueous electrolyte may be a gel or solid electrolyte.

[Method of Producing Nonaqueous Electrolyte Secondary Battery]

Figure 11:
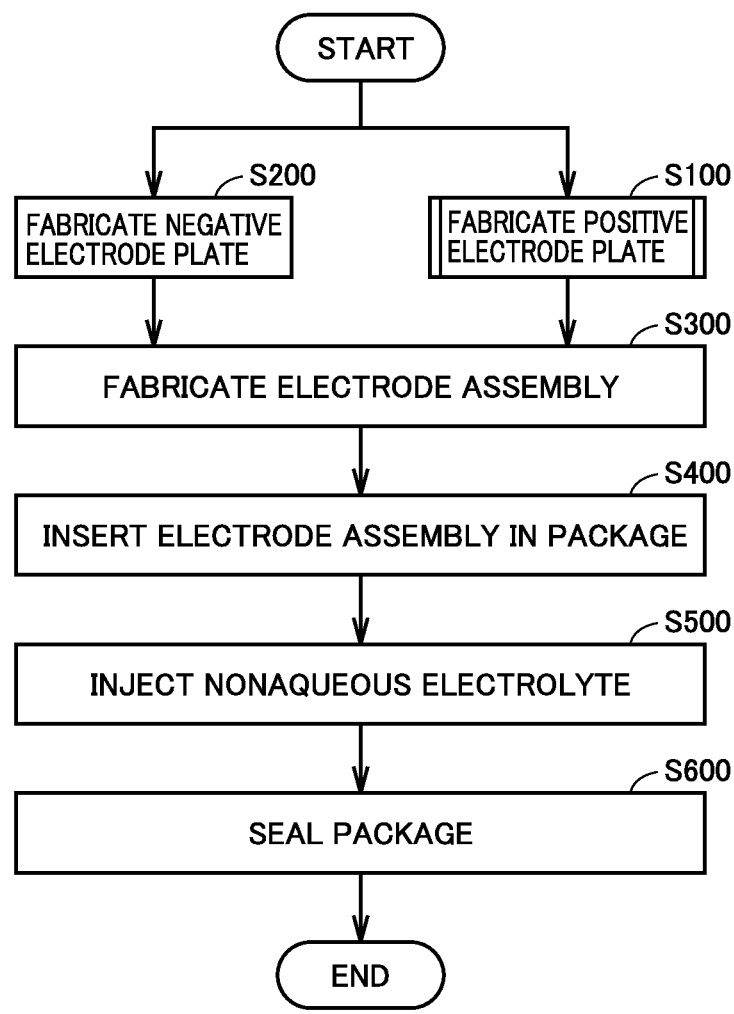
FIG. 11 is a flowchart schematically showing a method of producing the nonaqueous electrolyte secondary battery according to the embodiment of the present invention.

The nonaqueous electrolyte secondary battery of the present embodiment can be produced by the following production method. FIG. 11 is a flowchart schematically showing the method of producing the nonaqueous electrolyte secondary battery of the present embodiment. With reference to FIG. 11, the production method includes a step S100, a step S200, a step S300, a step S400, a step S500, and a step S600, and a feature of the production method particularly lies in that the production method includes step S100 (positive electrode fabricating step). Hereinafter, each of the steps will be illustrated.

<Step S100>

Figure 12:
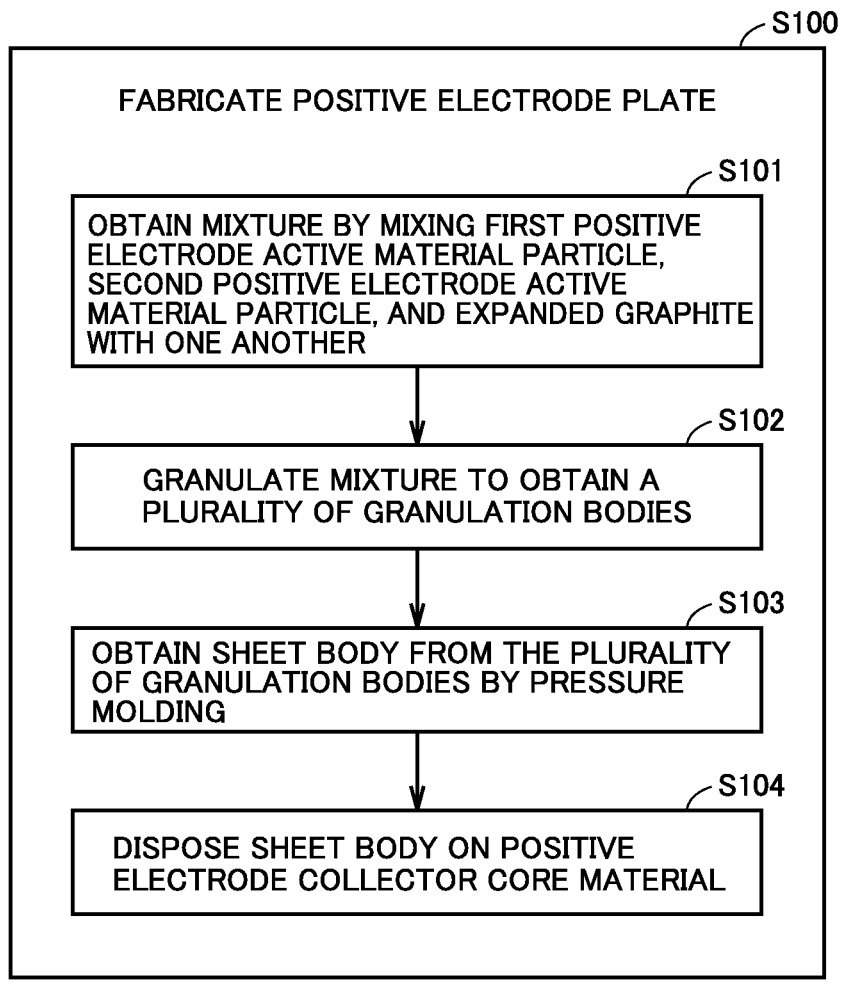
FIG. 12 is a flowchart schematically showing a positive electrode plate fabricating step according to the embodiment of the present invention.

In step S100, positive electrode plate 100 is fabricated. With reference to FIG. 12, step S100 includes a first step S101, a second step S102, a third step S103, and a fourth step S104.

(First Step)

In first step S101, a mixture is obtained by mixing first positive electrode active material particle 1 including lithium-nickel composite oxide, second positive electrode active material particle 2 including lithium iron phosphate, and expanded graphite 3 with one another. For example, the mixture is obtained by blending powder of first positive electrode active material particle 1, powder of second positive electrode active material particle 2, powder of expanded graphite 3, powder of the binder, and a solvent with one another at a predetermined mixed ratio, and mixing them using a mixing device. For the solvent, N-methyl-2-pyrrolidone (NMP) or the like can be used, for example.

Although the mixing device is not particularly limited, a stirring/mixing granulation device including a main agitating blade (agitator) and a disintegrating blade (chopper) is suitable because second positive electrode active material particle 2 and expanded graphite 3 can be brought into contact with each other efficiently. Examples of such a device include "High Speed Mixer" provided by EARTH-TECHNICA CO., LTD., and the like.

It should be noted that in order to attain a suitable distribution state, the mixture is preferably formed to be a clay-like mixture by setting a concentration of nonvolatile contents at about 80 to 90 mass % during mixing, and then adding a solvent to adjust the concentration of nonvolatile contents at about 70 to 80 mass %.

(Second Step)

In second step S102, the mixture is granulated to obtain a plurality of granulation bodies. A granulation method is not particularly limited, and the granulation can be performed by means of agitation granulation, fluid bed granulation, extrusion granulation, compression granulation, spray granulation or the like. Of these, the extrusion granulation is particularly suitable because expanded graphite 3 can be readily oriented and granulation body 10 can be formed into a pillar-like body with which the orientation can be readily controlled.

In the extrusion granulation, the shape and size of granulation body 10 can be adjusted by a die hole of an extrusion granulation device. For example, when the die hole is a circular hole, granulation body 10 is formed into a cylindrical body. The cylindrical body is preferable in view of packing property and orientation. When granulation body 10 is a cylindrical body, the cylindrical body preferably has a diameter D of not less than 0.5 mm and not more than 2.0 mm. This is because with the cylindrical body having diameter D falling within such a range, granulation body 10 is readily oriented in one direction during the process of forming into a sheet. Moreover, due to a similar reason, height H of the cylindrical body is desirably larger than diameter D. Height H of the cylindrical body preferably satisfies $D \leq H \leq 3D$, more preferably satisfies $D \leq H \leq 2D$, and particularly preferably satisfies $D \leq H \leq 1.5D$.

(Third Step)

In third step S103, sheet body 100b is obtained from the plurality of granulation bodies 10 by pressure molding. In this step, granulation body 10 is compressed to push expanded graphite 3 to the surface of granulation body 10. Accordingly, a good electric conduction path is formed between granulation bodies 10 adjacent to each other.

Examples of the pressure molding method include a roll drawing method, i.e., a method of compressing and drawing the plurality of granulation bodies 10 between rolls into a form of sheet. With this method, granulation bodies 10 can be readily oriented.

Figure 6:
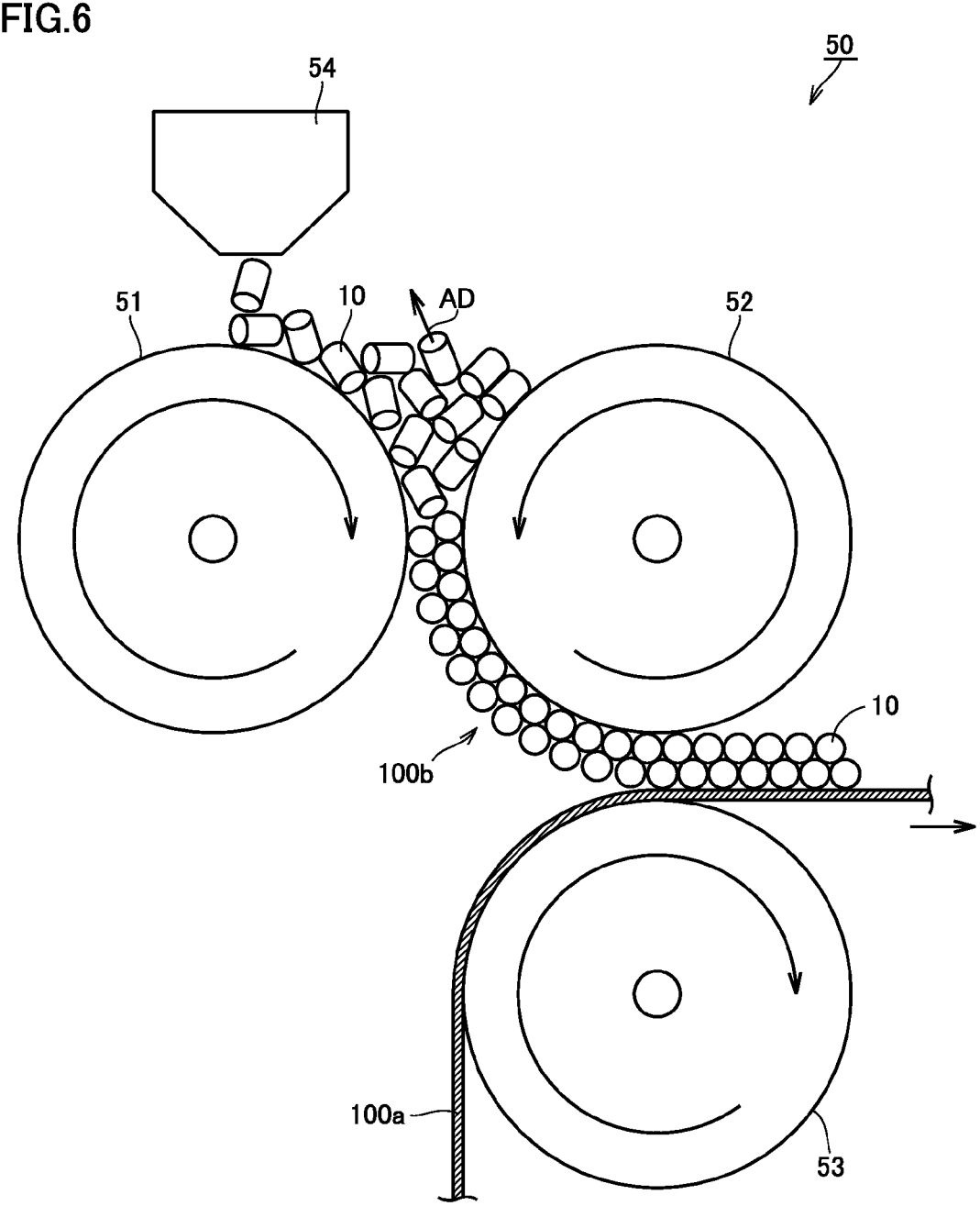
FIG. 6 is a schematic view illustrating a part of a positive electrode plate fabricating step according to the embodiment of the present invention.

FIG. 6 is a schematic view illustrating third step S103 and fourth step S104, and is a schematic cross sectional view showing a main portion of a molding and transfer-printing device 50 suitable for the step. With reference to FIG. 6, the plurality of granulation bodies 10 are supplied from a material supplying unit 54 onto an A roll 51. Granulation bodies 10 are conveyed on A roll 51 (or a B roll 52) in a direction of arrow to reach a space (gap) between A roll 51 and B roll 52. When granulation body 10 is a cylindrical body as shown in FIG. 6, granulation bodies 10 are oriented and aligned during the conveyance on the rolls such that their axial directions AD (height directions) are along the direction of rotation axis of the rolls. The plurality of granulation bodies 10 thus oriented are compressed and drawn between A roll 51 and B roll 52, and are accordingly formed into sheet body 100b while maintaining the orientation state. That is, the sheet can be formed such that the plurality of granulation bodies 10 are oriented in one direction in the plane direction.

The coating weight (mass per unit area) and thickness of sheet body 100b can be controlled by adjusting the gap between A roll 51 and B roll 52 and a load applied to A roll 51 and B roll 52. It should be noted that the width size (size in the short direction) of sheet body 100b can be regulated by providing a side wall (not shown) at a portion to be the end portion of sheet body 100b.

(Fourth Step)

In fourth step S104, sheet body 100b is disposed on positive electrode collector core material 100a. With reference to FIG. 6 again, sheet body 100b is conveyed in the direction of arrow on B roll 52, and reaches a gap between B roll 52 and a C roll 53. On the other hand, positive electrode collector core material 100a is conveyed in the direction of arrow on C roll 53, and reaches the gap between B roll 52 and C roll 53. In the gap between B roll 52 and C roll 53, sheet body 100b is fixed onto positive electrode collector core material 100a by pressure. In this way, sheet body 100b can be disposed (transfer-printed) on one main surface of positive electrode collector core material 100a. Then, the solvent in sheet body 100b is removed by a drying device (not shown) installed on the conveyance path.

It should be noted that positive electrode collector core material 100a (for example, Al foil) shown in FIG. 6 is an elongated strip-like body, and the short direction thereof coincides with the direction of the rotation axis of each roll. Therefore, with sheet body 100b being fixed onto positive electrode collector core material 100a by the above-mentioned operation, the orientation directions of the plurality of granulation bodies 10 are along the short direction of positive electrode collector core material 100a.

By performing a similar operation onto the other main surface of positive electrode collector core material 100a, sheet body 100b can be disposed on the each of the main surfaces of positive electrode collector core material 100a. Then, the combination of positive electrode collector core material 100a and sheet body 100b is rolled and cut into a predetermined size, thereby obtaining positive electrode plate 100.

<Step S200>

In step S200, negative electrode plate 200 is fabricated. For example, a negative electrode active material, a thickener, and a binder are kneaded in water to obtain a negative electrode coating material, the negative electrode coating material is applied and dried on negative electrode collector core material 200a to form negative electrode composite material layer 200b, thereby fabricating negative electrode plate 200. On this occasion, negative electrode composite material layer 200b may be rolled to adjust the thickness and composite material density thereof.

<Step S300 to Step S600>

Electrode assembly 400 can be fabricated by winding or stacking positive electrode plate 100 and negative electrode plate 200 to face each other with separator 300 interposed therebetween (step S300). Next, electrode assembly 400 is inserted in package 500 (step S400). Then, a nonaqueous electrolyte is injected from an inlet (not shown) provided in package 500 (step S500), and the inlet is sealed to close package 500 (step S600), thereby producing the nonaqueous electrolyte secondary battery (battery 1000) of the present embodiment.

Heretofore, the prismatic battery has been illustrated to explain the present embodiment, but the explanation is just exemplary, and the present embodiment is not limited to such a prismatic battery and the battery can be, for example, a cylindrical battery, a pouch type battery (also referred to as "laminate type battery"), or the like.

EXAMPLES

The following describes the present embodiment more in detail with reference to examples, but the present embodiment is not limited to these.

[Production of Nonaqueous Electrolyte Secondary Battery]

As shown in Table 1, various types of positive electrode plates were produced with various conditions being changed, and batteries employing the various types of positive electrode plates were produced and were evaluated in their performance.

TABLE 1

| | Nonvolatile contents Blending | | | | | | | |
|---|---|---|---|---|---|---|---|---|
| | First Positive Electrode Active Material Particle NCM Parts by Mass | Second Positive Electrode Active Material Particle LFPO/C Parts by Mass | Conductive Material | | Binder PVdF Parts by Mass | d50 of Expanded Graphite μm | Diameter D of Granulation Body mm | Production Process |
| | | | Expanded Graphite Parts by Mass | AB Parts by Mass | | | | |
| Example 1 | 100 | 10 | 2 | 1 | 2 | 5 | 1 | Extrusion Granulation → Sheet Formation → Disposition (Transfer) |
| Example 2 | 100 | 10 | 2 | 1 | 2 | 5 | 2 | Extrusion Granulation → Sheet Formation → Disposition (Transfer) |

TABLE 1-continued

| | First Positive Electrode Active Material Particle NCM Parts by Mass | Second Positive Electrode Active Material Particle LFPO/C Parts by Mass | Conductive Material | | | d50 of Expanded Graphite μm | Diameter D of Granulation Body mm | Production Process |
|---|---|---|---|---|---|---|---|---|
| | | | Expanded Graphite Parts by Mass | AB Parts by Mass | Binder PVdF Parts by Mass | | | |
| Example 3 | 100 | 10 | 2 | 1 | 2 | 5 | 0.5 | Extrusion Granulation → Sheet Formation → Disposition (Transfer) |
| Example 4 | 100 | 10 | 2 | 1 | 2 | 2 | 1 | Extrusion Granulation → Sheet Formation → Disposition (Transfer) |
| Example 5 | 100 | 10 | 2 | 1 | 2 | 15 | 1 | Extrusion Granulation → Sheet Formation → Disposition (Transfer) |
| Example 6 | 100 | 10 | 1 | 1 | 2 | 5 | 1 | Extrusion Granulation → Sheet Formation → Disposition (Transfer) |
| Example 7 | 100 | 10 | 4 | 1 | 2 | 5 | 1 | Extrusion Granulation → Sheet Formation → Disposition (Transfer) |
| Comparative Example 1 | 100 | 10 | 2 | 1 | 2 | 5 | — | Coating Material → Application |
| Comparative Example 2 | 100 | 10 | 2 | 1 | 2 | 5 | — | Mixture → Sheet Formation → Disposition (Transfer) |
| Example 8 | 100 | 10 | 2 | 1 | 2 | 5 | 0.2 | Extrusion Granulation → Sheet Formation → Disposition (Transfer) |
| Example 9 | 100 | 10 | 2 | 1 | 2 | 5 | 4 | Extrusion Granulation → Sheet Formation → Disposition (Transfer) |
| Example 10 | 100 | 10 | 2 | 1 | 2 | 1 | 1 | Extrusion Granulation → Sheet Formation → Disposition (Transfer) |
| Example 11 | 100 | 10 | 2 | 1 | 2 | 20 | 1 | Extrusion Granulation → Sheet Formation → Disposition (Transfer) |
| Comparative Example 3 | 100 | 10 | 0 | 1 | 2 | 5 | 1 | Extrusion Granulation → Sheet Formation → Disposition (Transfer) |
| Example 12 | 100 | 10 | 0.5 | 1 | 2 | 5 | 1 | Extrusion Granulation → Sheet Formation → Disposition (Transfer) |
| Example 13 | 100 | 10 | 7 | 1 | 2 | 5 | 1 | Extrusion Granulation → Sheet Formation → Disposition (Transfer) |

<Preparation of Material>

The following materials were prepared to fabricate each positive electrode plate.

1. First Positive Electrode Active Material Particle

Prepared as the powder of the first positive electrode active material particle was powder (average particle size: 8 μm) including $LiNi_{1/3}Co_{1/3}Mn_{1/3}O_2$ particle. In Table 1, this material is abbreviated as "NCM".

2. Second Positive Electrode Active Material Particle

Prepared as the powder of the second positive electrode active material particle was powder (average particle size: 3 μm) of composite particle including a secondary particle obtained by aggregation of $LiFePO_4$ (primary particle) and a carbon coating layer (conductive layer) formed on the surface of the secondary particle. In the composite particle, a mass ratio between $LiFePO_4$ (base material particle) and carbon (carbon coating layer) is as follows: $LiFePO_4$:carbon=99:1. In Table 1, the composite particle is abbreviated as "LFPO/C".

3. Expanded Graphite

Prepared as the powders of expanded graphite were five types of powders of expanded graphite (each provided by Chuetsu Graphite Works Co., Ltd) having different average particle sizes [average particle sizes: 1 μm, 2 μm, and 5 μm (trademark "BSP-5AS"), 15 μm (trademark "BSP-15AS"), and 20 μm (trademark "BSP-20AS")]. Here, the powders having average particle sizes of 1 μm and 2 μm were prepared by classifying "BSP-5AS" using a sieve.

4. Conductive Material

Prepared as the conductive material other than the expanded graphite was powder of acetylene black (AB) (trademark "DENKA BLACK" provided by DENKI KAGAKU KOGYO KABUSHIKI KAISHA).

5. Binder

Prepared as the binder was powder of PVdF (item number "KF7200" provided by KUREHA CORPORATION).

Hereinafter, a specific production process will be illustrated.

Example 1

Fabrication of Positive Electrode Plate

Step S100

With reference to FIG. 7, positive electrode plate 100 was fabricated which was an elongated strip-like body and had core-material exposed portion EP at one end portion in the short direction (width direction). In this experiment, a length size L1 of positive electrode plate 100 in FIG. 7 was set at 4500 mm and a width size W1 of sheet body 100b was set at 94 mm.

(First Step S101)

The above-described materials blended by amounts shown in Table 1 were introduced into a high speed mixer (provided by EARTHTECHNICA CO., LTD.), NMP (15 parts by mass) was added as a solvent, and they were mixed for 5 minutes with the rotation speed of an agitator being set at 300 rpm and the rotation speed of a chopper being set at 1200 rpm. Then, NMP (20 parts by mass) was further added, thereby obtaining a clay-like mixture.

(Second Step S102)

This mixture was then introduced into an in-line type cylindrical granulator (provided by EARTHTECHNICA CO., LTD.) having a circular die hole with a hole size of 1 mm so as to perform extrusion granulation with the rotation speed being set at 2000 rpm. Accordingly, the plurality of granulation bodies 10 (cylindrical bodies each having a diameter of 1 mm and a height of 1.5 mm) were obtained.

(Third Step S103 and Fourth Step S104)

The plurality of granulation bodies 10 were supplied to material supplying unit 54 of molding and transfer-printing device 50 shown in FIG. 6. Then, the plurality of granulation bodies 10 were compressed and drawn between A roll 51 and B roll 52 to form them into sheet body 100b, which was then transferred onto one main surface of positive electrode collector core material 100a (Al foil having a thickness of 20 µm) between B roll 52 and C roll 53. That is, sheet body 100b was pressed against positive electrode collector core material 100a, thereby disposing sheet body 100b on positive electrode collector core material 100a. Then, sheet body 100b was dried using a hot air type drying device (not shown). On this occasion, the gap between A roll 51 and B roll 52 was adjusted such that the coating weight of the sheet body after the drying would become 30 mg/cm$^2$. Further, in the same manner, sheet body 100b was also disposed on the other main surface of positive electrode collector core material 100a.

Next, a rolling mill was used to roll the combination of sheet body 100b and positive electrode collector core material 100a, and the combination thereof was cut by a slitter to obtain positive electrode plate 100 (thickness: 170 µm).

(Fabrication of Negative Electrode Plate: Step S200)

With reference to FIG. 8, negative electrode plate 200 was fabricated which was an elongated strip-like body and had core-material exposed portion EP at one end portion in the short direction. In this experiment, a length size L2 of negative electrode plate 200 was set at 4700 mm and a width size W2 of negative electrode composite material layer 200b was set at 100 mm.

First, graphite powder (negative electrode active material), CMC serving as a thickener (item type "BSH-6" provided by DAI-ICHI KOGYO SEIYAKU CO., LTD.), and SBR (binder) were mixed such that the negative electrode active material:the thickener:the binder=100:1:0.8 (mass ratio), and were kneaded in water, thereby obtaining a negative electrode coating material.

Then, a die coater was used to apply and dry the negative electrode coating material on each of the main surfaces of negative electrode collector core material 200a (Cu foil having a thickness of 14 µm), thereby forming negative electrode composite material layer 200b. Then, a rolling mill was used to roll negative electrode composite material layer 200b, which was then cut using a slitter, thereby obtaining a negative electrode plate 200 (thickness: 150 µm).

(Preparation of Separator)

First, a separator base material (thickness: 25 µm) having a three-layer structure of PP/PE/PP was prepared. Next, alumina particle (96 parts by mass) serving as an inorganic filler, an acryl-based resin binder (four parts by mass), and a solvent (ion exchange water) were mixed with one another using a CLEARIVIIX (provided by M Technique Co., Ltd.), thereby obtaining a slurry to serve as a heat-resistant layer. Then, a gravure coater was used to apply and dry the slurry on the separator base material, thereby forming the heat-resistant layer on the base material. Accordingly, separator 300 was obtained.

(Preparation of Nonaqueous Electrolyte)

EC, DMC and EMC were mixed to attain EC:DMC:EMC=3:4:3 (volume ratio), thereby obtaining a mixed solvent. Next, LiPF$_6$ (1.0 mol/L), CHB (1 mass %), and BP (1 mass %) were dissolved in the mixed solvent. Accordingly, a liquid nonaqueous electrolyte was obtained.

(Assembling: Step S300 to Step S600)

With reference to FIG. 9, positive electrode plate 100 and negative electrode plate 200 were wound to face each other with separator 300 interposed therebetween, thereby obtaining an elliptic wound body. Next, a plate pressing machine was used to press the elliptic wound body into a flat shape under a normal temperature (pressure: 4 kN/cm$^2$; time: 2 minutes), thereby obtaining electrode assembly 400 (step S300).

With reference to FIG. 10, positive electrode collector plate 102 was welded to positive electrode collector core material 100a exposed at one end portion on winding axis AW of electrode assembly 400, and negative electrode collector plate 202 was welded to negative electrode collector core material 200a exposed at the other end portion. Next, positive electrode collector plate 102 was welded to positive electrode terminal 104 provided in package 500 made of Al, and negative electrode terminal 204 was welded to negative electrode collector plate 202. Furthermore, electrode assembly 400 was inserted in package 500 (step S400), and the nonaqueous electrolyte (125 g) prepared above was injected via an inlet (not shown) provided in package 500 (step S500). Then, the inlet was sealed to close package 500 (step S600), thereby obtaining a prismatic nonaqueous electrolyte secondary battery having a rated capacity of 24 Ah.

Examples 2, 3, 8, and 9

Each of the nonaqueous electrolyte secondary batteries was obtained in the same manner as in Example 1 except that the hole size of the die hole of the in-line type cylindrical granulator was changed and diameter D of the granulation body was changed as shown in Table 1.

Examples 4, 5, 10, and 11

Each of the nonaqueous electrolyte secondary batteries was obtained in the same manner as in Example 1 except that d50 (average particle size) of the expanded graphite was changed as shown in Table 1.

Examples 6, 7, 12, and 13

Each of the nonaqueous electrolyte secondary batteries was obtained in the same manner as in Example 1 except that the blending amount of the expanded graphite was changed as shown in Table 1.

Comparative Example 1

The powder materials were mixed with one another using the high speed mixer to obtain a clay-like mixture, and then 40 parts by mass of NMP was further added to form the mixture into a coating material. Then, a die coater was used to apply and dry the coating material on each of the main surfaces of the positive electrode collector core material to fabricate a positive electrode plate. Apart from these, the nonaqueous electrolyte secondary battery was obtained in the same manner as in Example 1.

Comparative Example 2

The nonaqueous electrolyte secondary battery was obtained in the same manner as in Example 1 except that the powder materials were mixed with each other using the high speed mixer to obtain a clay-like mixture, then the clay-like mixture was supplied directly to molding and transfer-printing device 50 shown in FIG. 6 to obtain a sheet body, and then the sheet body was disposed on the positive electrode collector core material. It should be noted that the clay-like mixture is similar to a coating material, and the first positive electrode active material particle, the second positive electrode active material particle, and the expanded graphite do not form the granulation body.

Comparative Example 3

The nonaqueous electrolyte secondary battery was obtained in the same manner as in Example 1 except that the expanded graphite was not used as shown in Table 1.

[Evaluation]

Each of the positive electrode plates and each of the batteries were evaluated as described below. It should be noted that in the description below, the unit "C" of current value is intended to represent a value of current with which the rated capacity of the battery was discharged in 1 hour. It should be also noted that "CC" is intended to represent constant current, "CV" is intended to represent constant voltage, and "CP" is intended to represent constant power.

(Evaluation of Orientation)

The orientations of the expanded graphite and the granulation body in each of the positive electrode plates obtained above were evaluated by the X-ray diffraction method. That is, a sample of a predetermined area was obtained from the positive electrode plate, and an X-ray diffraction pattern thereof was measured using an X-ray diffractometer. Then, intensity of a (110) plane peak was divided by intensity of a (004) plane peak, and the intensity of the (110) plane peak was divided by intensity of a (002) plane peak, thereby finding intensity ratios $I_{(110)}/I_{(004)}$ and $I_{(110)}/I_{(002)}$. The results are shown in Table 2. In Table 2, it is indicated that as values in the columns of $I_{(110)}/I_{(004)}$ and $I_{(110)}/I_{(002)}$ are larger, the expanded graphite and the granulation body are oriented strongly.

(Measurement of Initial Capacity)

First, under a normal temperature (about 25° C.) environment, charging was performed to 4.1 V with a current value of 1 C (24 A) and was then suspended for 5 minutes, and thereafter discharging was performed to 3.0 V with a current value of 1 C and was then suspended for 5 minutes.

Next, CC-CV charging (CC current value: 1 C; CV voltage: 4.1 V; end current: 0.1 C) and CC-CV discharging (CC current value: 1 C; CV voltage: 3.0 V; end current: 0.1 C) were performed to measure initial capacity (discharging capacity).

(Measurement of Constant Power Output Value at Low SOC)

In a thermostatic chamber set at 25° C., charging was performed to 4.1 V with a current value of 0.2 C (4.8 A) and then was suspended for 5 minutes, thereafter discharging was performed to 3.0 V with a current value of 0.2 C, and the capacity was checked. Based on the checked capacity, an electric charge corresponding to a SOC of 20% was provided to the battery.

Next, the battery was placed for 4 hours in a thermostatic chamber set at −15° C., and then CP discharging of three levels was performed for 8 to 12 seconds under the same environment so as to find a constant power output value, with which 2.5 V was reached in 10 seconds, in accordance with a relation between the discharging time and the electric power. The result is shown in Table 2. In Table 2, each of numerical values shown in the column "Constant Power Output Value at Low SOC" is an arithmetic mean value for ten batteries.

(Measurement of Post-Cycle Capacity Retention Ratio)

1000 charging/discharging cycles were performed in the thermostatic chamber set at 50° C., assuming that CC charging (current value: 2 C; end voltage: 4.1 V) and CC discharging (current value: 2 C; end voltage: 3.0 V) constitutes one cycle.

After the 1000 cycles, post-cycle capacity was measured again under the same conditions as those in the "Measurement of Initial Capacity" above, and percentage of a value

TABLE 2

| | Orientation (XRD Intensity Ratio) | | Battery Performance | | |
| --- | --- | --- | --- | --- | --- |
| | | | Constant Power Output | Post-Cycle Capacity | Post-High-temperature storage Capacity |
| | $I_{(110)}/I_{(004)}$ | $I_{(110)}/I_{(002)}$ | Value at Low SOC W | Retention ratio % | Retention ratio % |
| Example 1 | 0.095 | 0.050 | 321 | 90.1 | 97.4 |
| Example 2 | 0.103 | 0.051 | 320 | 90.0 | 97.3 |
| Example 3 | 0.089 | 0.049 | 321 | 90.1 | 97.3 |
| Example 4 | 0.110 | 0.048 | 322 | 90.0 | 97.2 |
| Example 5 | 0.120 | 0.051 | 320 | 90.2 | 97.1 |
| Example 6 | 0.093 | 0.048 | 320 | 90.1 | 97.3 |
| Example 7 | 0.090 | 0.052 | 322 | 90.3 | 97.1 |
| Comparative Example 1 | 0.002 | 0.006 | 265 | 84.3 | 85.2 |
| Comparative Example 2 | 0.052 | 0.007 | 272 | 84.2 | 84.3 |
| Example 8 | 0.050 | 0.032 | 279 | 88.2 | 85.1 |
| Example 9 | 0.060 | 0.032 | 278 | 90.1 | 97.2 |
| Example 10 | 0.030 | 0.031 | 320 | 86.2 | 84.2 |
| Example 11 | 0.087 | 0.051 | 280 | 85.3 | 97.2 |
| Comparative Example 3 | 0.010 | 0.002 | 278 | 82.1 | 97.2 |
| Example 12 | 0.023 | 0.003 | 291 | 88.2 | 97.1 |
| Example 13 | 0.102 | 0.052 | 320 | 90.0 | 84.3 | obtained by dividing the post-cycle capacity by the initial capacity was regarded as the post-cycle capacity retention ratio. The result is shown in Table 2. In Table 2, each of numerical values shown in the column "Post-Cycle Capacity Retention ratio" is an arithmetic mean value for five batteries.

(Measurement of Post-High-Temperature Storage Capacity Retention Ratio)

After adjusting the SOC of each battery to 100% under a 25° C. environment, the battery was retained for 100 days in a thermostatic chamber set at 60° C. After passage of 100 days, the battery was taken out from the thermostatic chamber and post-storage capacity thereof was measured under the same conditions as those in the "Measurement of Initial Capacity" above. Then, percentage of a value obtained by dividing the post-storage capacity by the initial capacity was regarded as the post-high-temperature storage capacity retention ratio. The result is shown in Table 2. In Table 2, each of numerical values shown in the column "Post-High-temperature storage Capacity Retention ratio" is an arithmetic mean value for fifty batteries.

Result and Review

1. As to Comparative Example 1

Comparative Example 1 is inferior in output at a low SOC and durability even though Comparative Example 1 has the same nonvolatile contents blending as those in Example 1 and the like. This can be explained by the dispersion state of each material. Specifically, in Comparative Example 1, it is considered that because the positive electrode plate was fabricated by the application of coating material, convection takes place in the coating layer when volatilizing a large amount of solvent, resulting in an uneven dispersion state of each material. Accordingly, it is considered that not only lithium iron phosphate fail to exhibit a sufficient output but also a larger load is imposed on the lithium iron phosphate during the high-temperature cycles and the high-temperature storage to result in elution of a metallic element (Fe) from the lithium iron phosphate, which leads to a decreased characteristic.

2. As to Comparative Example 2

Comparative Example 2 is also inferior in output at a low SOC and durability even though Comparative Example 2 has the same nonvolatile contents blending as those in Example 1 and the like. As described above, since the extrusion granulation is not performed in Comparative Example 2, granulation is insufficient and intensity ratio $I_{(110)}/I_{(002)}$, which is an index representing the orientation of the expanded graphite, has a small value as shown in Table 1. Hence, it is considered that formation of an electric conduction path between the materials, thus, an electric conduction network is insufficient to result in a low output. Also, it is considered that since the expansion/contraction of the lithium iron phosphate cannot be efficiently eased by the expanded graphite, the electric conduction network is broken during the endurance, thus resulting in a low capacity retention ratio after the endurance.

3. As to Comparative Example 3

In Comparative Example 3, the extrusion granulation was performed but the expanded graphite was not blended. Therefore, the expansion/contraction of the lithium iron phosphate cannot be eased, thus resulting in noticeable capacity deterioration after the cycles.

4. As to Examples

In contrast to the Comparative Examples described above, the battery according to each of the Examples is excellent in output characteristic at a low SOC and is also excellent in durability. In these batteries, each of the granulation bodies contains the first positive electrode active material particle including lithium-nickel composite oxide, the second positive electrode active material particle including lithium iron phosphate, and the expanded graphite. Accordingly, it is considered that the expansion/contraction of the lithium iron phosphate is eased by the expanded graphite in each granulation body, and the electric conduction network can be maintained even after the cycle endurance or the high-temperature endurance, thus resulting in a high capacity retention ratio after the endurance.

In addition to this, the granulation body was produced by the extrusion granulation method, so that the granulation body was covered with the expanded graphite and the expanded graphite was oriented, thereby reducing electric resistance. Furthermore, it is considered that since the granulation body is in the form of a cylindrical body (pillar-like body), the orientation is also provided to the granulation bodies in the sheet body to form a secure electric conduction network, thus resulting in significant improvement in output characteristic.

Moreover, it is considered that the second positive electrode active material particle including lithium iron phosphate has a carbon conductive layer on its surface to provide high affinity between the expanded graphite and the second positive electrode active material particle, thus contributing to improvement in the battery performance.

5. Examples 1 to 3, 8 and 9

These batteries are different from one another mainly in diameter D of the granulation body (cylindrical body). As understood from Table 1 and Table 2, Example 8 with a diameter D of less than 0.5 mm provides decreased orientation (XRD intensity ratio) and decreased battery performance as compared with Examples 1 to 3 each with a diameter D of not less than 0.5 mm and not more than 2.0 mm. Moreover, Example 9 with a diameter D of not less than 2.0 mm also provides decreased orientation and decreased battery performance as compared with Examples 1 to 3. From these results, it is considered that when the granulation body has a diameter D of not less than 0.5 mm and not more than 2.0 mm, particularly high orientation is exhibited and battery performance is improved.

6. Examples 1, 4, 5, 10, and 11

These batteries are different from one another mainly in the average particle size (d50) of the expanded graphite. As understood from Table 1 and Table 2, Example 10 with d50 of less than 2 μm provides decreased battery performance as compared with Examples 1, 4, and 5 each with d50 of not less than 2 μm and not more than 15 μm. This is presumably because the expanded graphite is too small and elasticity is therefore lost, with the result that it cannot follow the expansion/contraction of the lithium iron phosphate.

Further, Example 11 with d50 of more than 15 μm also provides decreased battery performance as compared with Examples 1, 4, and 5. This is presumably because the expanded graphite is too much larger than the positive electrode active material particle and therefore a good dispersion state cannot be attained during the granulation. Therefore, it can be said that the average particle size (d50) of the expanded graphite is preferably not less than 2 μm and not more than 15 μm.

7. Examples 1, 6, 7, 12, and 13

These batteries are different from one another mainly in the blending ratio of the nonvolatile contents during the granulation. Example 12 in which a blending amount of the expanded graphite is less than 1 part by mass provides a decreased output characteristic as compared with Examples 1, 6, and 7 in each of which the blending amount is not less than 1 part by mass and not more than 4 parts by mass. This is presumably because the expanded graphite is too small and a sufficient electric conduction path or electric conduction network cannot be formed.

Moreover, Example 13 in which the blending amount is more than 4 parts by mass provides a decreased capacity retention ratio after the high-temperature storage. This is presumably because the expanded graphite is too much and side reaction accordingly takes place during the high-temperature storage. Hence, it can be said that the ratio of the expanded graphite in the nonvolatile contents of the sheet body is preferably not less than 1 part by mass and not more than 4 parts by mass. It should be noted that this range corresponds to a range of not less than 0.88 mass % and not more than 3.42 mass %, when assuming that the whole of the sheet body is 100 mass %.

From the description above, it can be said that it has been proved that excellent output characteristic at a low SOC and excellent durability are attained in a nonaqueous electrolyte secondary battery including: a positive electrode collector core material; and a sheet body including a plurality of granulation bodies, the sheet body being disposed on the positive electrode collector core material, the granulation bodies each containing a first positive electrode active material particle, a second positive electrode active material particle, and expanded graphite, the first positive electrode active material particle including lithium-nickel composite oxide, the second positive electrode active material particle including lithium iron phosphate.

Further, as described above, this nonaqueous electrolyte secondary battery is provided by a method of producing a nonaqueous electrolyte secondary battery, including: a first step of obtaining a mixture by mixing a first positive electrode active material particle, a second positive electrode active material particle, and expanded graphite with one another, the first positive electrode active material particle including lithium-nickel composite oxide, the second positive electrode active material particle including lithium iron phosphate; a second step of obtaining a plurality of granulation bodies by granulating the mixture; and a third step of obtaining a sheet body from the plurality of granulation bodies by pressure molding; and a fourth step of disposing the sheet body on a positive electrode collector core material.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A nonaqueous electrolyte secondary battery, comprising:
   a positive electrode collector core material; and
   a sheet body including a plurality of granulation bodies, each of said granulation bodies having a pillar shape,
   wherein said sheet body is disposed on said positive electrode collector core material,
   wherein said granulation bodies each contain a first positive electrode active material particle, a second positive electrode active material particle, and expanded graphite, the first positive electrode active material particle including lithium-nickel composite oxide, the second positive electrode active material particle including lithium iron phosphate, and
   wherein said granulation bodies are oriented in one direction in a plane direction of said sheet body.

2. The nonaqueous electrolyte secondary battery according to claim 1, wherein said positive electrode collector core material is an elongated strip-like body, and said granulation bodies are oriented in a short direction of said positive electrode collector core material in said plane direction of said sheet body.

3. The nonaqueous electrolyte secondary battery according to claim 1, wherein said granulation bodies each have a diameter of not less than 0.5 mm and not more than 2.0 mm.

4. The nonaqueous electrolyte secondary battery according to claim 1, wherein said expanded graphite is exposed at a surface of said granulation bodies.

5. The nonaqueous electrolyte secondary battery according to claim 1, wherein said second positive electrode active material particle has a surface provided with a conductive layer including carbon.

6. A method of producing a nonaqueous electrolyte secondary battery, comprising:
   a first step of obtaining a mixture by mixing a first positive electrode active material particle, a second positive electrode active material particle, and expanded graphite with one another, said first positive electrode active material particle including lithium-nickel composite oxide, said second positive electrode active material particle including lithium iron phosphate;
   a second step of obtaining a plurality of granulation bodies by granulating said mixture, each of said granulation bodies having a pillar shape; and
   a third step of obtaining a sheet body from said granulation bodies by pressure molding; and
   a fourth step of disposing said sheet body on a positive electrode collector core material,
   wherein said granulation bodies are oriented in one direction in a plane direction of said sheet body.

7. The method of producing the nonaqueous electrolyte secondary battery according to claim 6, wherein said second step is a step of obtaining said granulation bodies by extrusion granulation.

8. A nonaqueous electrolyte secondary battery, comprising:
   a positive electrode collector core material; and
   a sheet body including a plurality of granulation bodies,
   wherein said sheet body is disposed on said positive electrode collector core material,
   wherein said granulation bodies each contain a first positive electrode active material particle, a second positive electrode active material particle, and expanded graphite, the first positive electrode active material particle including lithium-nickel composite oxide, the second positive electrode active material particle including lithium iron phosphate
   wherein said expanded graphite is oriented in an axial direction of said granulation bodies.

9. The nonaqueous electrolyte secondary battery according to claim 1, wherein said expanded graphite is oriented in an axial direction of said granulation bodies.

10. A method of producing a nonaqueous electrolyte secondary battery, comprising:
   a first step of obtaining a mixture by mixing a first positive electrode active material particle, a second positive electrode active material particle, and expanded graphite with one another, said first positive electrode active material particle including lithium-nickel composite oxide, said second positive electrode active material particle including lithium iron phosphate;
   a second step of obtaining a plurality of granulation bodies by granulating said mixture; and
   a third step of obtaining a sheet body from said granulation bodies by pressure molding; and
   a fourth step of disposing said sheet body on a positive electrode collector core material,
   wherein said expanded graphite is oriented in an axial direction of said granulation bodies.

11. The method of producing the nonaqueous electrolyte secondary battery A according to claim 10, wherein each of said granulation bodies have a pillar shape.

\* \* \* \* \*